(12) United States Patent
Bandameedipalli et al.

(10) Patent No.: US 10,108,851 B2
(45) Date of Patent: Oct. 23, 2018

(54) FACE RECOGNITION IN AN ENTERPRISE VIDEO CONFERENCE

(71) Applicant: Motorola Mobility LLC, Chicago, IL (US)

(72) Inventors: Jyothsna Bandameedipalli, Karnataka (IN); Amit Kumar Agrawal, Karnataka (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/806,636

(22) Filed: Nov. 8, 2017

(65) Prior Publication Data

US 2018/0268200 A1 Sep. 20, 2018

(51) Int. Cl.
*H04N 7/14* (2006.01)
*G06K 9/00* (2006.01)
(Continued)

(52) U.S. Cl.
CPC ... *G06K 9/00288* (2013.01); *G06F 17/30268* (2013.01); *G06K 9/00228* (2013.01);
(Continued)

(58) Field of Classification Search
CPC ............... G01S 5/0072; G06F 17/3028; G06F 17/30268; G06K 9/00228; G06K 9/00288; G06K 9/00744; G06K 9/6201; G06K 9/6202; G06Q 10/105; G06Q 50/01; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 5/455; H04N 7/14; H04N 7/141; H04N 7/142; H04N 7/144; H04N 7/147; H04N 7/148; H04N 7/15;
(Continued)

(56) References Cited

U.S. PATENT DOCUMENTS 9,344,520 B2 * 5/2016 Griffin .................. H04L 67/306
9,419,810 B2 * 8/2016 Jones ..................... H04N 7/157
(Continued)

OTHER PUBLICATIONS

"Face Recognition in Videos with OpenCV", OpenCV, Date Unknown. Retrieved from https://docs.opencv.org/2.4/modules/contrib/doc/facerec/tutorial/facerec_video_recognition.html#id1.
(Continued)

*Primary Examiner* — Khai N. Nguyen
(74) *Attorney, Agent, or Firm* — John L. Rogitz

(57) ABSTRACT

A video conference invite is accessed and names and/or account addresses in the invite are used to obtain information of people listed on the invite from a database. The information can include template photographs of the people and locations of the people. During a video conference that is subject of the invite, when it is determined that a video feed of the video conference indicates that plural participants are together in a single room, images of faces in the video feed are efficiently matched against only template photographs of people in the database indicated by the database as being associated with the room.

18 Claims, 7 Drawing Sheets

(51) Int. Cl.
*G06F 17/30* (2006.01)
*G06Q 10/10* (2012.01)
*G06K 9/62* (2006.01)
*H04N 7/15* (2006.01)
*H04N 5/445* (2011.01)
*G06Q 50/00* (2012.01)

(52) U.S. Cl.
CPC ....... *G06K 9/00744* (2013.01); *G06K 9/6201* (2013.01); *G06K 9/6202* (2013.01); *G06Q 10/105* (2013.01); *H04N 5/445* (2013.01); *H04N 7/147* (2013.01); *H04N 7/15* (2013.01); *G06Q 50/01* (2013.01)

(58) Field of Classification Search
CPC ........ H04N 7/152; H04N 7/155; H04N 7/157; H04N 7/23206; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | |
|---|---|---|---|
| 9,712,784 B2* | 7/2017 | Griffin | H04N 7/147 |
| 2015/0350372 A1* | 12/2015 | Griffin | H04L 67/306 |
| | | | 348/14.07 |
| 2016/0212377 A1* | 7/2016 | Griffin | H04L 67/306 |
| 2018/0157321 A1* | 6/2018 | Liu | G06F 3/013 |

OTHER PUBLICATIONS

R. Gross, Jie Yang, A. Wiebel, "Face recognition in a meeting room", Abstract Only, Proceedings Fourth IEEE International Conference on Automatic Face and Gesture Recognition (Cat. No. PR00580), Mar. 28-30, 2000. Retrieved from http://ieeexplore.ieee.org/document/840649/.

* cited by examiner

Extracting Participant Details (1)

```
Patent Committee Meeting
Date:
Time:
Description:

Participants        Email
            A               A@m.com
           [B]              B@m.com
            C               C@m.com
           [D]              D@m.com
            E               E@m.com
            F               F@m.com
           [G]              G@m.com
```

FIG. 4

Extracting Participant Details (2)

— B name
— B location
— B country

— D name
— D location
— D country

— G name
— G location
— G country

FACE RECOGNITION IN AN ENTERPRISE VIDEO CONFERENCE

FIELD

The present application relates to technically inventive, non-routine solutions that are necessarily rooted in computer technology and that produce concrete technical improvements.

BACKGROUND

A video conference call across various geographies is a common way of meeting people inside or across different enterprises. This helps in face-to-face discussion and at the same time saves time and money compared to meeting in person.

In cases in which each meeting participant joins the video call from their respective devices, it is typically easy to obtain their names for introduction purposes. As understood herein however, enterprise meetings are usually held and attended by multiple participants across different locations, with multiple participants being co-located in the same meeting location or room.

SUMMARY

As understood herein, it being preferable to provide the name of each of the participants of a video conference but due to time constraints precluding formal introduction, and to remind people of names even if formal introductions have been made, a need exists for improved participant identification in video conferencing.

Accordingly, in one aspect a device includes at least one processor and storage accessible to the at least one processor and including instructions executable by the processor to access an invite to a video conference. The instructions are executable to access a database of enterprise personnel to fetch at least respective photographs and locations of respective participants indicated on the invite. Furthermore, the instructions are executable to determine that plural participants are co-located in a location, such as a room, during the video conference. Based on the locations of respective participants indicated on the invite, the instructions are executable to execute face recognition on the plural participants co-located in the room by matching images of the plural participants co-located in the room against photographs of only enterprise personnel fetched from the database whose locations match the room. Responsive to at least one output of the face recognition, the instructions are executable to indicate on at least one output device during the video conference names of the plural participants co-located in the room along with live video images of the plural participants co-located in the room.

In example embodiments, the instructions can be executable to, responsive to the output of the face recognition indicating that at least one of the plural participants co-located in the room is not recognized, expand executing face recognition on unrecognized participants of the plural participants co-located in the room by matching images of the unrecognized participants against photographs of only enterprise personnel listed on the invite to the video conference regardless of locations in the database. The instructions may be further executable to, responsive to the output of the face recognition indicating that at least one of the plural participants co-located in the room is not recognized after expanding the matching images of the unrecognized participants against photographs of only enterprise personnel listed on the invite to the video conference regardless of locations in the database, expand the matching to all enterprise personnel.

In example implementations, the instructions may be executable to exclude from the matching of images of the plural participants co-located in the room template photographs of enterprise personnel calling in as solitary participants from a room with no other participants. In some examples, the instructions are executable to expand photographs of enterprise personnel to photographs obtained from social network sites correlated to the enterprise personnel as indicated in the database of enterprise personnel.

In another aspect, a method includes accessing a video conference invite and using names and/or account addresses in the invite, obtaining information of people listed on the invite from a database. The information includes template photographs of the people and locations of the people. The method includes, during a video conference that is subject of the invite, determining that at least one video feed of the video conference indicates that plural participants are together in a single room, and if so, matching images of faces in the video feed against only template photographs of people in the database indicated by the database as being associated with the room.

A computer storage that is not a transitory signal is also disclosed that includes instructions executable by a processor for executing the above method.

The details of present principles, both as to their structure and operation, can best be understood in reference to the accompanying drawings, in which like reference numerals refer to like parts, and in which:

BRIEF DESCRIPTION OF THE DRAWINGS

FIGS. 4 and 5 are schematic diagrams illustrating various aspects of the logic in FIG. 3;

DETAILED DESCRIPTION

Figure 1:
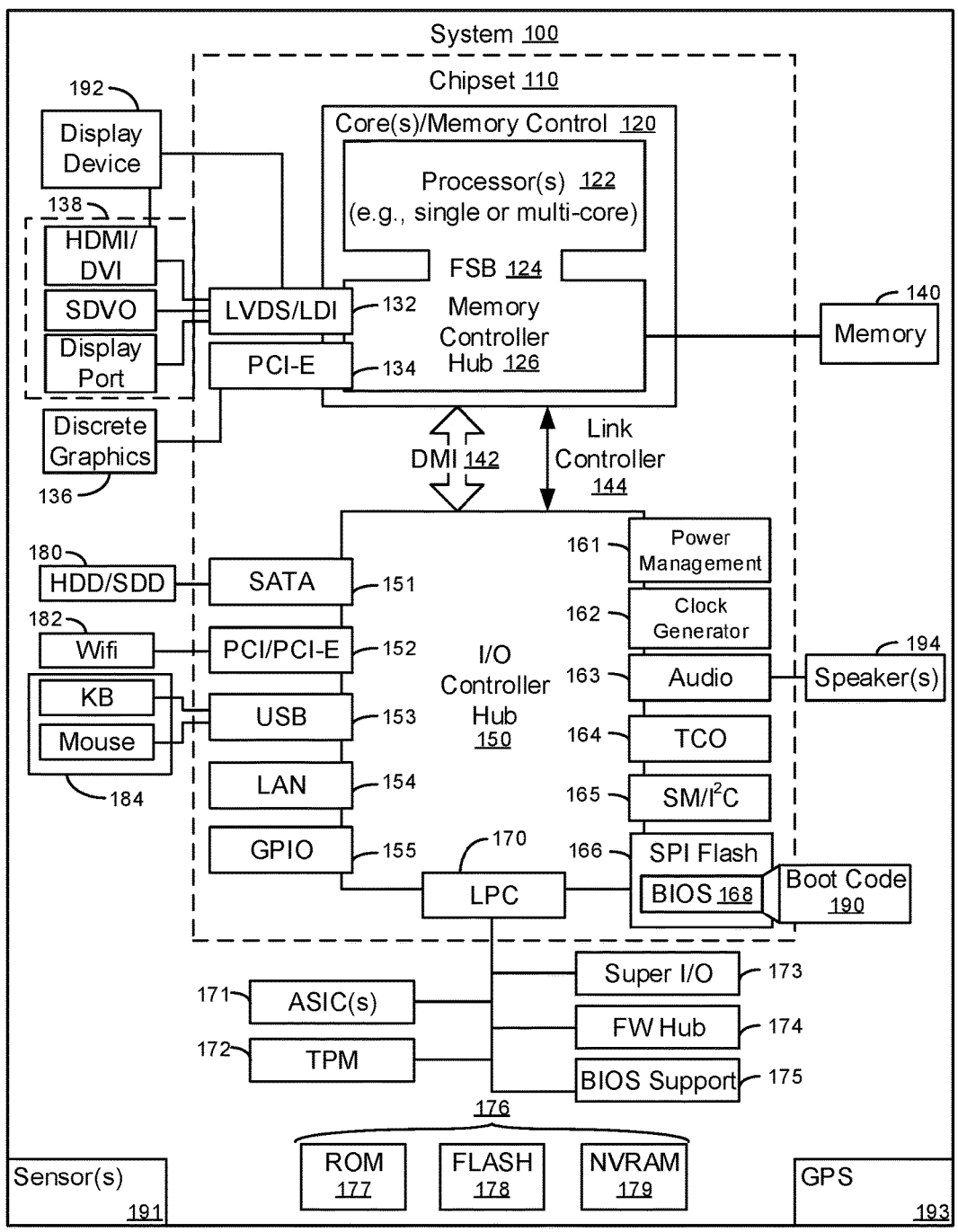
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191 from which input may be received for the system 100. For example, the sensor 191 may be an audio receiver/microphone that provides input from the microphone to the processor 122 based on audio that is detected, such as via a user providing audible input to the microphone, so that the user may be identified based on voice identification. As another example, the sensor 191 may be a camera that gathers one or more images and provides input related thereto to the processor 122 so that the user may be identified based on facial recognition or other biometric recognition. The camera may be a thermal imaging camera, a digital camera such as a webcam, a three-dimensional (3D) camera, and/or a camera otherwise integrated into the system 100 and controllable by the processor 122 to gather pictures/images and/or video. The sensor 191 may also be, for instance, another kind of biometric sensor for use for such purposes, such as a fingerprint reader, a pulse monitor, a heat sensor, etc.

The sensor 191 may even be a motion sensor such as a gyroscope that senses and/or measures the orientation of the system 100 and provides input related thereto to the processor 122, and/or an accelerometer that senses acceleration and/or movement of the system 100 and provides input related thereto to the processor 122. Thus, unique and/or particular motion or motion patterns may be identified to identify a user as being associated with the motions/patterns in accordance with present principles.

Additionally, the system 100 may include a location sensor such as but not limited to a global positioning satellite (GPS) transceiver 193 that is configured to receive geographic position information from at least one satellite and provide the information to the processor 122. However, it is to be understood that another suitable position receiver other than a GPS receiver may be used in accordance with present principles to determine the location of the system 100. In some embodiments, the GPS transceiver 193 may even establish a sensor for use in accordance with present principles to identify a particular user based on the user being associated with a particular location (e.g., a particular building, a particular location within a room of a personal residence, etc.)

It is to be understood that an example client device or other machine/computer may include fewer or more features than shown on the system 100 of FIG. 1. In any case, it is to be understood at least based on the foregoing that the system 100 is configured to undertake present principles.

Figure 2:
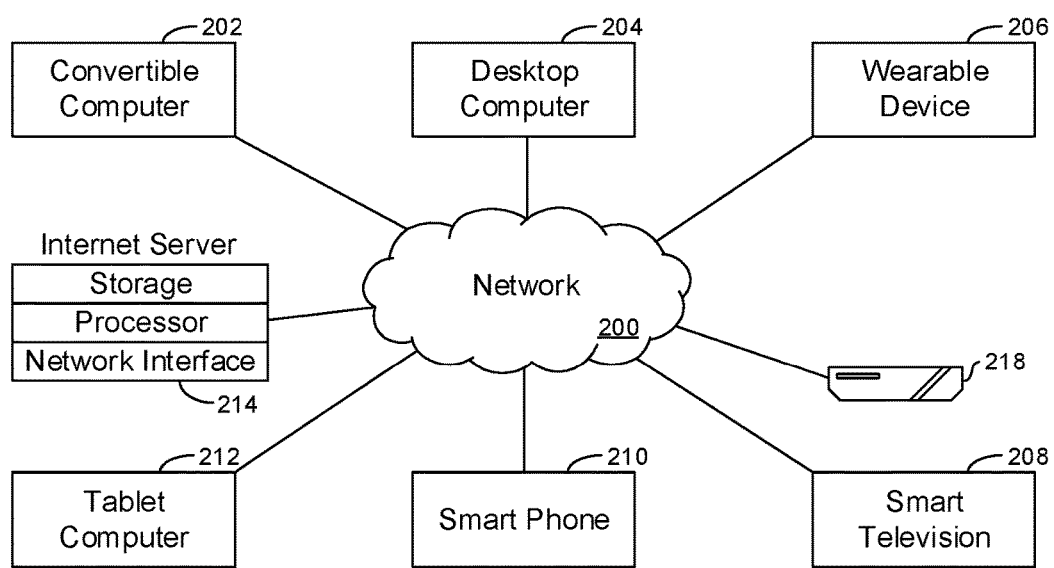
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a server 214 such as an Internet server that may provide cloud storage accessible to the devices shown in FIG. 2, and a game console 218. It is to be understood that the devices shown in FIG. 2 are configured to communicate with each other over the network 200 to undertake present principles.

Figure 3:
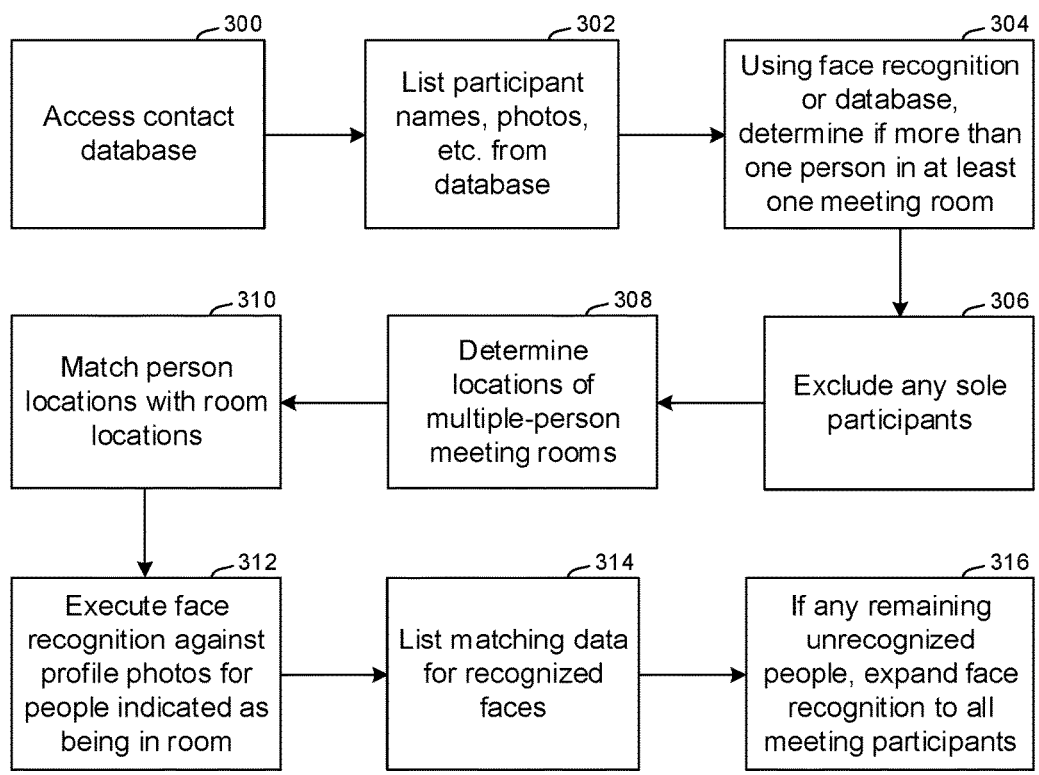
FIG. 3 is a flow chart of first example logic consistent with present principles.

Now referring to FIG. 3, a video conference invite typically is generated and sent via computer through an enterprise to invite participants to the conference. The invite typically includes the email addresses of the participants to whom it is sent.

Using this invite, commencing at block 300 the enterprise personnel database is accessed to retrieve information at block 302 for each enterprise participant on the list. This information may include participant details including name, photos, location, email id, phone number, and social networking accounts associated with email id/phone number, etc. If desired, during this step and using the social media profiles, social media sites of the participants may also be accessed to obtain additional photos of the participants beyond those available in the enterprise database.

At block 304, during the schedules video conference call that was the subject of the invite, it is determined using relatively coarse face recognition technology whether more than one person exists in at least one meeting room. This can be done by simply counting the number of faces in each video feed input to the video conference without attempting to recognize specific faces as yet. Participants who have joined the video conference call directly from their account and are a lone participant from a single device can be excluded at block 306 from further processing hereunder, since the account ID typically accompanying their particular feed (email address, phone number, etc.) uniquely identifies them, obviating the need to process them further for present purposes.

Moving to block 308, the location of each meeting room in which more than one participant has joined the meeting is determined. This can be done using information in the video feed from that room, such as but not limited to correlating a call-in phone number with a room location using the enterprise database. The location could also be fetched from the GPS and/or Assisted GPS services executing on the device on which the conference call is being held.

Once the multi-participant room location is known, it is matched, again using the enterprise database, with one of the participants, who typically will be associated with the room in the enterprise database at block 310. More refined face recognition is then executed at block 312 on the images in the multi-participant video feed using, as templates, the photos of the participants gleaned from the enterprise database and also using, when available, photos gleaned from social networking sites. Thus, the matching can be usefully limited to accessing only the photos of the non-excluded (sole) participants and identified in the invite to compare against images in the video feed from the multi-participant feed. In other words, the only template photos that need be considered by the face recognition software to identify participants in the multi-participant feed are those from block 302 less those excluded at block 306.

Once the faces in the multi-participant feed are recognized, the logic moves to block 314 to list the matching data for the matching faces. To do this the system can superimpose onto the multi-participant feed the names and email addresses and if desired phone numbers of each recognized person, with the appropriate data being superimposed nearest the person to which it pertains.

Block 316 understands that in the event that block 312 did not recognize one or more faces, the base of template photos to use for comparison with the live video images may be expanded to all meeting participants listed in the invite, and if this still results in an unrecognized face, the entire enterprise database may be searched at that point. This last expansion recognizes that employees not formally invited may nonetheless be present in a multi-participant room.

FIG. 4 schematically illustrates extracting participant details from a list of personnel in an enterprise database. FIG. 4 assumes that a video conference titled "patent committee meeting" including its date, time, and description has invited employees B, D, and G. Accordingly, the database is entered to obtain the email addresses and other information including photos of employees B, D, and G.

Figure 5:
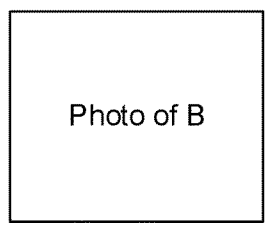
Figure 5:
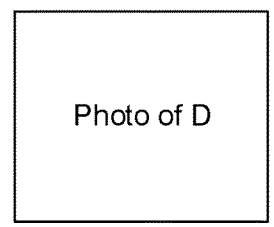
Figure 5:
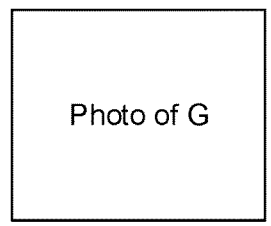

The extracted data is then collected in a limited temporary data store as schematically shown in FIG. 5, in which one or more photos of each participant B, D, and G is collected and associated with information about that person, including name, location within the enterprise, and country where applicable.

Figure 6:
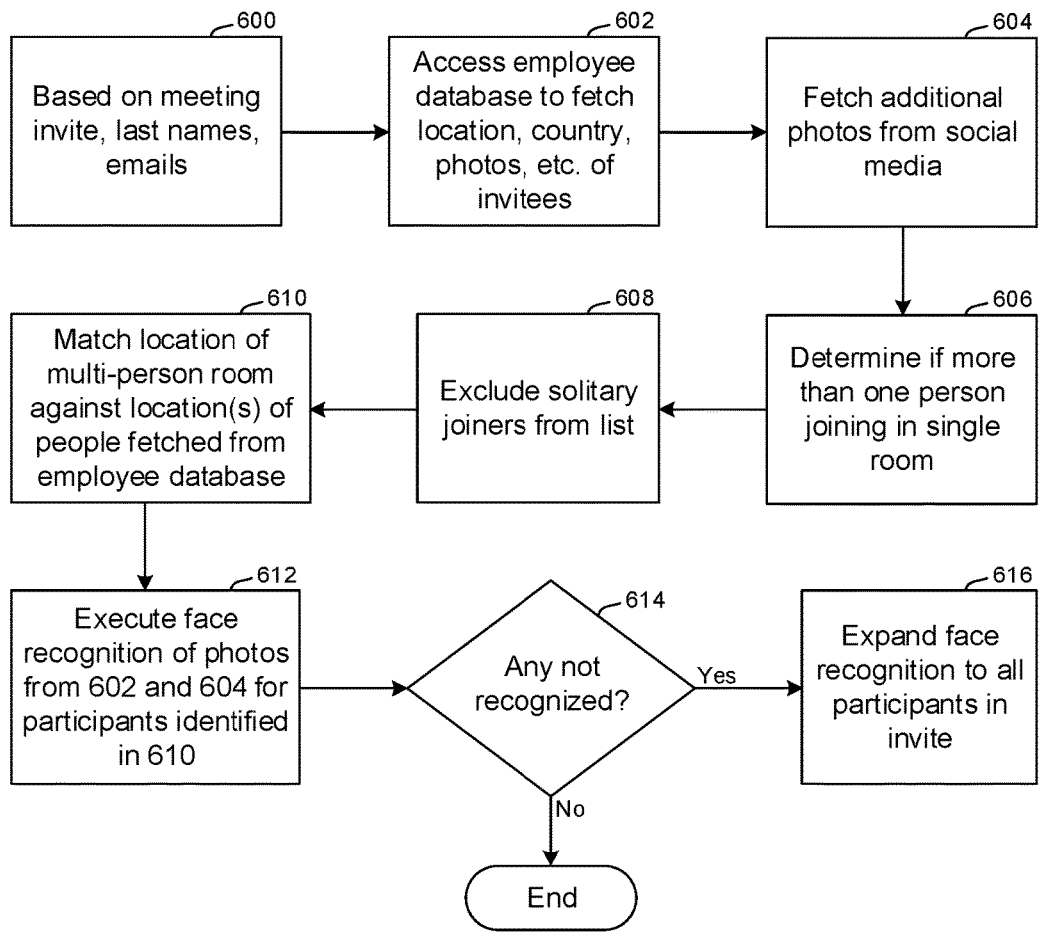
FIG. 6 is a flow chart of second example logic consistent with present principles.

Now referring to FIG. 6, a video conference invite typically is generated and sent via computer through an enterprise to invite participants to the conference. The invite typically includes the email addresses of the participants to whom it is sent.

Using this invite, commencing at block 600 the names and email addresses of the invitees are gathered and used at block 602 to enter an enterprise personnel database to retrieve information for each enterprise invitee/participant on the list. This information may include participant details including name, photos, location, email id, phone number, social networking accounts associated with email id/phone number, etc. If desired, during this step and using the social media profiles, at block 604 social media sites of the participants may also be accessed to obtain additional photos of the participants beyond those available in the enterprise database.

At block 606, during the schedules video conference call that was the subject of the invite, it is determined using relatively coarse face recognition technology whether more than one person exists in at least one meeting room. This can be done by simply counting the number of faces in each video feed input to the video conference without attempting to recognize specific faces as yet. Participants who have joined the video conference call directly from their account and are a lone participant from a single device can be excluded at block 608 from further processing hereunder, since the account ID typically accompanying their particular feed (email address, phone number, etc.) uniquely identifies them, obviating the need to process them further for present purposes.

Assume for purposes of the use case of FIG. 6 that several people have joined from Chicago in one meeting room and several others have joined from a meeting room in Bangalore, India.

Moving to block 610, the location of each meeting room in which more than one participant has joined the meeting is determined. This can be done using information in the video feed from that room, such as but not limited to correlating a call-in phone number with a room location using the enterprise database. The location could also be fetched from the GPS and/or Assisted GPS services executing on the device on which the conference call is being held.

Once the multi-participant room location(s) are known, they are matched with one or more of the participants, who typically will be associated with the room in the enterprise database. Continuing with the specific example used to illustrate this use case, assume that the step at block 610 has matched the location of the two multi-participant meeting rooms against the locations of the participants fetched from the enterprise contact database to determine that two have joined from India and ten have joined from the U.S.

At block 612 more refined face recognition is then executed on the images in the multi-participant video feed using, as templates, the photos of the participants gleaned from the enterprise database at block 602 and also using, when available, photos gleaned from social networking sites at block 604. Thus, the matching can be usefully limited to accessing only the photos of the non-excluded (sole) participants and identified in the invite to compare against images in the video feed from the multi-participant feed. In other words, the only template photos that need be considered by the face recognition software to identify participants in the multi-participant feed are those from blocks 602 and 604 less those excluded at block 608.

Indeed, the base of templates against which faces must be matched may be reduced even further. In the example of this use case, for instance, only two template faces need be matched against the images of the two people who have joined from India, while a greater number of template faces would matched but limited only to those employees on the invite list and listed in the database as being located in the U.S.

Decision diamond 614 indicates that if all faces on a multi-participant room are recognized, the process may end by, e.g., following the step of FIG. 3 of superimposing participant information next to the relevant faces in the video feed from the multi-participant room. But in the event that a face in a video feed is not recognized, the logic proceeds to block 616 to expand the number of template photos to search to all meeting participants listed in the invite, and if this still results in an unrecognized face, the entire enterprise database may be searched at that point. This last expansion recognizes that employees not formally invited may nonetheless be present in a multi-participant room.

For this last step, again referred to the specific use case of FIG. 6, assume employee "Bob" from the U.S. has traveled to India and is taking the meeting in India in the conference room in Bangalore along with other people from India. Assume further his location is not updated in the enterprise database. The algorithm first attempts to match images in the Bangalore feed against photos of employees both invited to the meeting and listed as being located in India, and when this fails (because Bob is not listed as being located in India), the set of template images to match video images against is expanded from the set of people located in India to all invitees.

This solution improves upon recognizing a face by running the face recognition algorithm against the complete set of employee contact database versus running the face recognition algorithm against a very limited set of employee template photos which is marked by determining the meeting participant list and further narrowing it down to their location.

Figure 7:
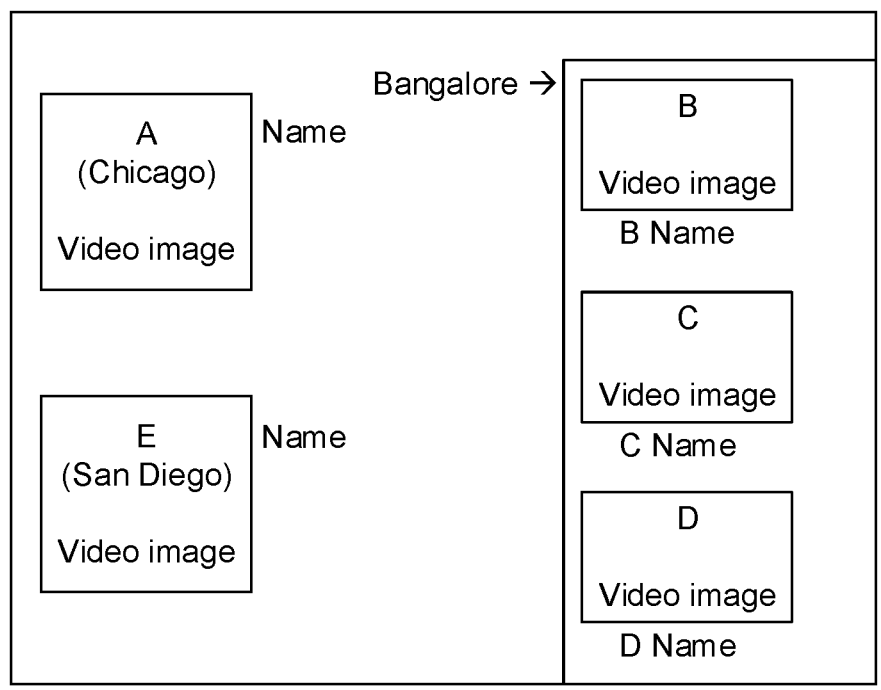
FIG. 7 is a user interface (UI) consistent with the logic of FIG. 3 or 6.

FIG. 7 illustrates an example output of the processes described above after all faces in a multi-participant room have been identified. Assume FIG. 7 illustrates a video conference presentation on a large screen display with three windows as shown for each one of three locations providing feeds to the video conference. Participants A and E have called in from their respective homes as solitary participants and so their respective video images appear as show on the left in FIG. 7 along with their names and locations and if desired additional information as discussed above. The names and locations of participants A and E, as shown, are displayed closest to the people they respectively are associated with, so a viewer easily can tell who the imaged people are.

On the other hand, a video feed window on the right of FIG. 7 shows that participants B, C, and D have joined from Bangalore and all are shown in the same window. Their respective names, which have been obtained as described above, are juxtaposed with their respective images (along with additional personal information if desired).

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor, the storage comprising instructions executable by the processor to:
   access an invite to a video conference;
   access a database of enterprise personnel to fetch at least respective photographs and locations of respective participants indicated on the invite;
   determine that plural participants are co-located in a first location of the plural locations during the video conference;
   based on the locations of respective participants indicated on the invite, execute face recognition on the plural participants co-located in the first location by matching images of the plural participants co-located in the first location against photographs of only enterprise personnel fetched from the database whose locations match the first location; and
   responsive to at least one output of the face recognition, indicate on at least one output device during the video conference names of the plural participants co-located in the first location along with live video images of the plural participants co-located in the first location.

2. The device of claim 1, wherein the instructions are executable to:
   responsive to the output of the face recognition indicating that at least one of the plural participants co-located in the first location is not recognized, expand executing face recognition on unrecognized participants of the plural participants co-located in the first location by matching images of the unrecognized participants against photographs of only enterprise personnel listed on the invite to the video conference regardless of locations in the database.

3. The device of claim 2, wherein the instructions are executable to:
   responsive to the output of the face recognition indicating that at least one of the plural participants co-located in the first location is not recognized after expanding the matching images of the unrecognized participants against photographs of only enterprise personnel listed on the invite to the video conference regardless of locations in the database, expand the matching to all enterprise personnel.

4. The device of claim 1, wherein the instructions are executable to:
   exclude from the matching of images of the plural participants co-located in the first location template photographs of enterprise personnel calling in as solitary participants from a location with no other participants.

5. The device of claim 1, wherein the instructions are executable to:
   expand photographs of enterprise personnel to photographs obtained from social network sites correlated to the enterprise personnel as indicated in the database of enterprise personnel.

6. A method comprising:
   accessing a video conference invite;

using names and/or account addresses in the invite, obtaining information of people listed on the invite from a database, the information including template photographs of the people and locations of the people;

during a video conference that is subject of the invite, determining that at least one video feed of the video conference indicates that plural participants are together in a single room; and matching images of faces in the video feed against only template photographs of people in the database indicated by the database as being associated with the single room.

7. The method of claim 6, comprising:

responsive to the matching, presenting personal information of the people in the single room on a video representation of the video conference.

8. The method of claim 6, comprising:

matching images of faces in the video feed against only template photographs of people in the database indicated by the database as being associated with the single room, wherein the template photographs include photographs in the database and photographs obtained from one or more social networking sites.

9. The method of claim 6, comprising:

excluding from the matching step template photographs of people listed on the invite calling in to the video conference as solitary people with no other participants in a room in which the solitary people are calling in from.

10. The method of claim 6, comprising:

responsive to not matching an image of a first face in the video feed to a template photograph, expanding the matching to template photographs of all people listed in the invite.

11. The method of claim 10, comprising:

responsive to not matching an image of a first face in the video feed to a template photograph, expanding the matching to template photographs of all people listed in the database.

12. A computer storage that is not a transitory signal and that comprises instructions executable by at least one processor for:

accessing a video conference invite;

using names and/or account addresses in the invite, obtaining information of people listed on the invite from a database, the information including template photographs of the people and locations of the people;

during a video conference that is subject of the invite, determining that at least one video feed of the video conference indicates that plural participants are together in a single room; and matching images of faces in the video feed against only template photographs of people in the database indicated by the database as being associated with the single room.

13. The computer storage of claim 12, wherein the instructions are executable for:

responsive to the matching, presenting personal information of the people in the single room on a video representation of the video conference.

14. The computer storage of claim 12, wherein the instructions are executable for:

matching images of faces in the video feed against only template photographs of people in the database indicated by the database as being associated with the single room, wherein the template photographs include photographs in the database and photographs obtained from one or more social networking sites.

15. The computer storage of claim 12, wherein the instructions are executable for:

excluding from the matching step template photographs of people listed on the invite calling in to the video conference as solitary people with no other participants in a room in which the solitary people are calling in from.

16. The computer storage of claim 12, wherein the instructions are executable for:

responsive to not matching an image of a first face in the video feed to a template photograph, expanding the matching to template photographs of all people listed in the invite.

17. The computer storage of claim 16, wherein the instructions are executable for:

responsive to not matching an image of a first face in the video feed to a template photograph, expanding the matching to template photographs of all people listed in the database.

18. The computer storage of claim 12, comprising the at least one processor.

* * * * *